US012308566B2

(12) United States Patent
Wu

(10) Patent No.: US 12,308,566 B2
(45) **Date of Patent: *May 20, 2025**

(54) PLUG CONNECTOR

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

( * ) Notice: Subject to any disclaimer, the term of this patent is extended or adjusted under 35 U.S.C. 154(b) by 314 days.

This patent is subject to a terminal disclaimer.

(21) Appl. No.: 17/994,277

(22) Filed: Nov. 26, 2022

(65) Prior Publication Data

US 2024/0178614 A1 May 30, 2024

(51) Int. Cl.

*H01R 13/627* (2006.01)
*H01R 13/502* (2006.01)
*H01R 13/635* (2006.01)
*H01R 24/00* (2011.01)

(52) U.S. Cl.

CPC ....... *H01R 13/6275* (2013.01); *H01R 13/502* (2013.01); *H01R 13/635* (2013.01); *H01R 24/00* (2013.01)

(58) Field of Classification Search

CPC .............. H01R 13/6272; H01R 13/635; H01R 13/6335; H01R 13/502; H01R 24/00; H01R 13/6275

USPC .................................................. 439/352, 372

See application file for complete search history.

(56) References Cited

U.S. PATENT DOCUMENTS 5,174,786 A * 12/1992 Kato .................... H01R 13/641 439/352
6,146,179 A * 11/2000 Denny ............... H01R 13/6335 439/352
6,254,418 B1 * 7/2001 Tharp ................ H01R 13/6335 439/352

(Continued)

*Primary Examiner* — Gary F Paumen
(74) *Attorney, Agent, or Firm* — Chun-Ming Shih; LANWAY IPR SERVICES

(57) ABSTRACT

A plug connector includes an insulating housing, a conductive terminal and a lock release assembly. The insulating housing includes a main body part and a hollow plunger. The conductive terminal is contained in the insulating housing. The lock release assembly is installed in the insulating housing and includes a locking part and an actuating part separately installed with respect to the locking part. The actuating part is pivotally connected to the main body part. The locking part includes a hinge and a lock tab. A hook is formed at an end of the lock tab away from the hinge. An action force is applied to the actuating part to drive the locking part to rotate to release the hook of the lock tab from the butt connector. In this way, the plug connector can be manufactured easily, and pressed smoothly to facilitate the release.

10 Claims, 11 Drawing Sheets

(56) References Cited

U.S. PATENT DOCUMENTS

| | | | | |
|---|---|---|---|---|
| 6,953,356 | B2 * | 10/2005 | Hisamatsu | H01R 13/6273<br>439/258 |
| 8,783,968 | B2 * | 7/2014 | Adams | G02B 6/3893<br>439/352 |
| 2005/0075001 | A1 * | 4/2005 | Shearman | H01R 43/26<br>439/352 |
| 2008/0311781 | A1 * | 12/2008 | Wojcik | H01R 13/506<br>439/352 |
| 2011/0111617 | A1 * | 5/2011 | Handshaw | H01R 43/26<br>439/352 |
| 2016/0322750 | A1 * | 11/2016 | Plamondon | H01R 13/6272 |

* cited by examiner

PLUG CONNECTOR

BACKGROUND OF THE DISCLOSURE

Technical Field

The technical field relates to electrical connectors, and more particularly relates to a plug connector.

Description of Related Art

Electrical connector is a connection structure used for connecting a power supply to a device, connecting a device to another device, or connecting internal units of a device to form a circuit. The electrical connector is generally formed by a butt connector and a plug connector combined and electrically connected to each other, and the butt connector and the plug connector are electrically connected to a socket terminal and a plug terminal respectively, and the socket terminal and the plug terminal are separately formed by a fixed housing and a chip.

The related-art plug connectors mainly include an insulating housing, a plurality of conductive terminals and a locking mechanism, and the conductive terminal is installed in the insulating housing, and the locking mechanism is formed on the insulating housing and locked to or unlocked from the butt connector.

However, the plug connector has the following problems in actual use. Since the locking mechanism and the insulating housing of the plug connector are formed in one piece, and the locking mechanism is formed in the outer space of the insulating housing, the mold used to make these components is bound to be increased by a considerable extent, thereby increasing the cost of the mold. In addition, the locking mechanism is a one-piece component and has various functions such as rotation, locking, unlocking and elastic restoration, etc. As a result, the level of difficulty for the manufacture may be greatly increased. Further, due to the amount of deformation occurred during the operation of the locking mechanism, there are adverse situations such as applying insufficient or excessive force that may affect the unlocking efficiency.

In view of the aforementioned problems, the discloser proposed this disclosure based on his expert knowledge and elaborated researches to overcome the problems of the related art.

SUMMARY OF THE DISCLOSURE

The primary objective of this disclosure is to provide a plug connector based on a separate configuration of a locking part and an actuating part, which is not only easy to manufacture, but also easy to press, operate, and unlock.

To achieve the aforementioned and other objectives, this disclosure discloses a plug connector plugged and combined with a butt connector, and the plug connector includes an insulating housing, a plurality of conductive terminals and a lock release assembly, and the insulating housing includes a main body part and a plurality of hollow plungers spaced apart from each other and extended from the main body part; each conductive terminal is contained in the insulating housing corresponding to each hollow plunger; the lock release assembly is installed on the insulating housing, and the lock release assembly includes a locking part and an actuating part separately installed with respect to the locking part, and the actuating part is arranged corresponding to the locking part and pivotally connected to the main body part, and the locking part includes a hinge connected to the main body part, a lock tab extended from the hinge, and a hook formed at an end of the lock tab away from the hinge; wherein when an action force is applied to the actuating part, the actuating part drives the locking part to rotate to unlock (or unbuckle) the hook of the lock tab from the butt connector.

This disclosure further has the following effects. By the arrangement of a restoring spring plate, the actuating part is securely fixed on the main body part.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
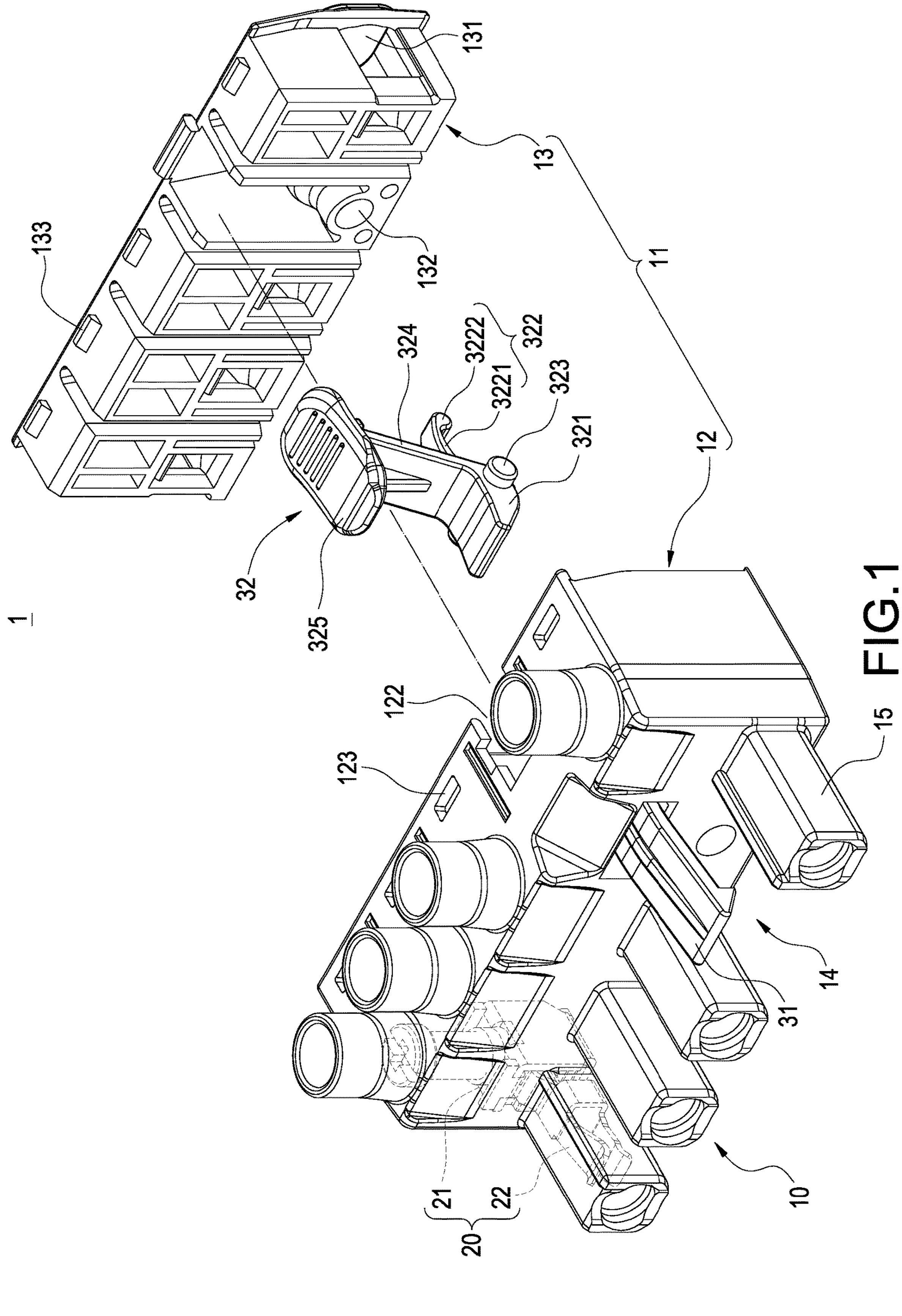
FIG. 1 is an exploded view of a plug connector of this disclosure.
Figure 2:
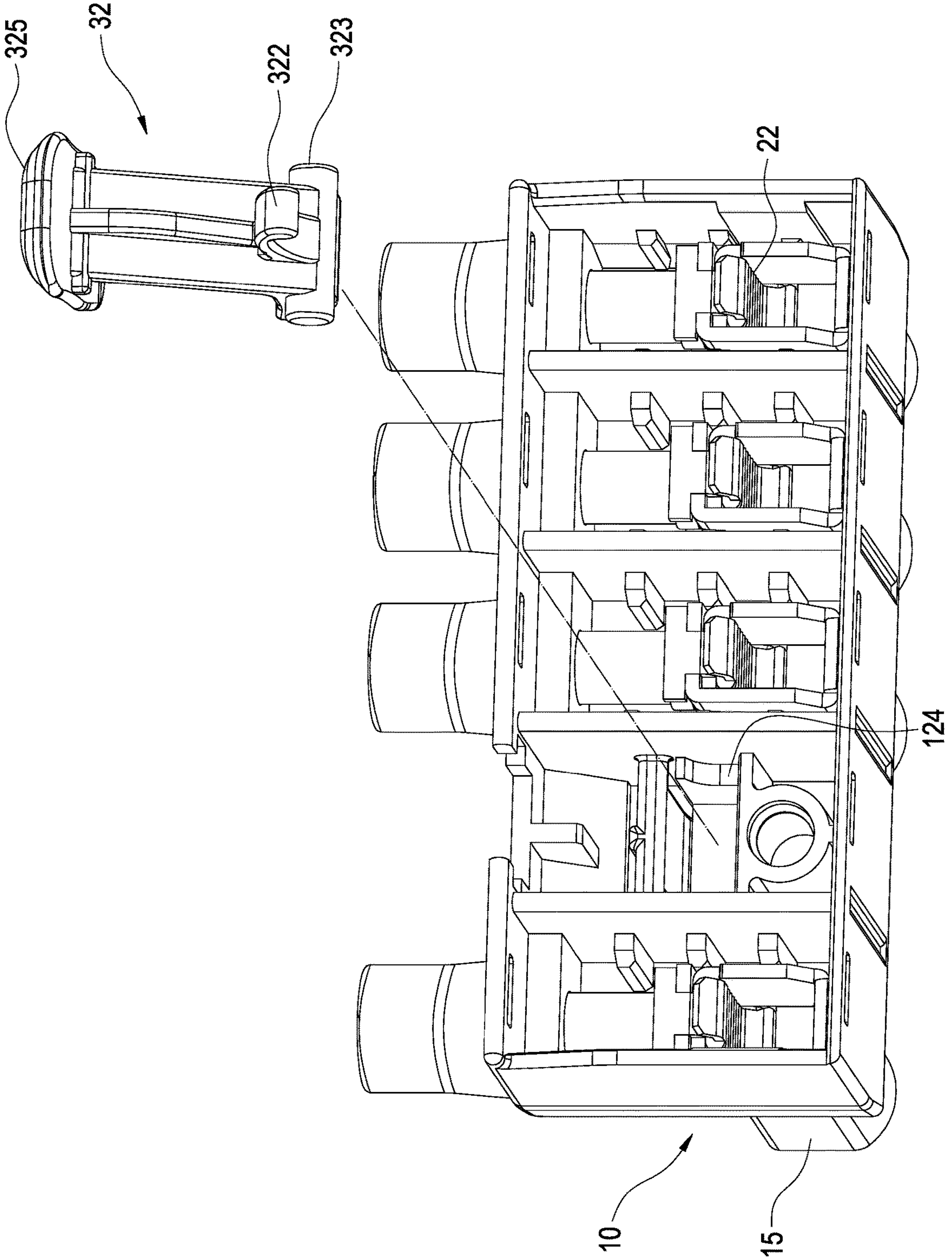
FIG. 2 is an exploded view showing a front casing and an actuating part of this disclosure.
Figure 3:
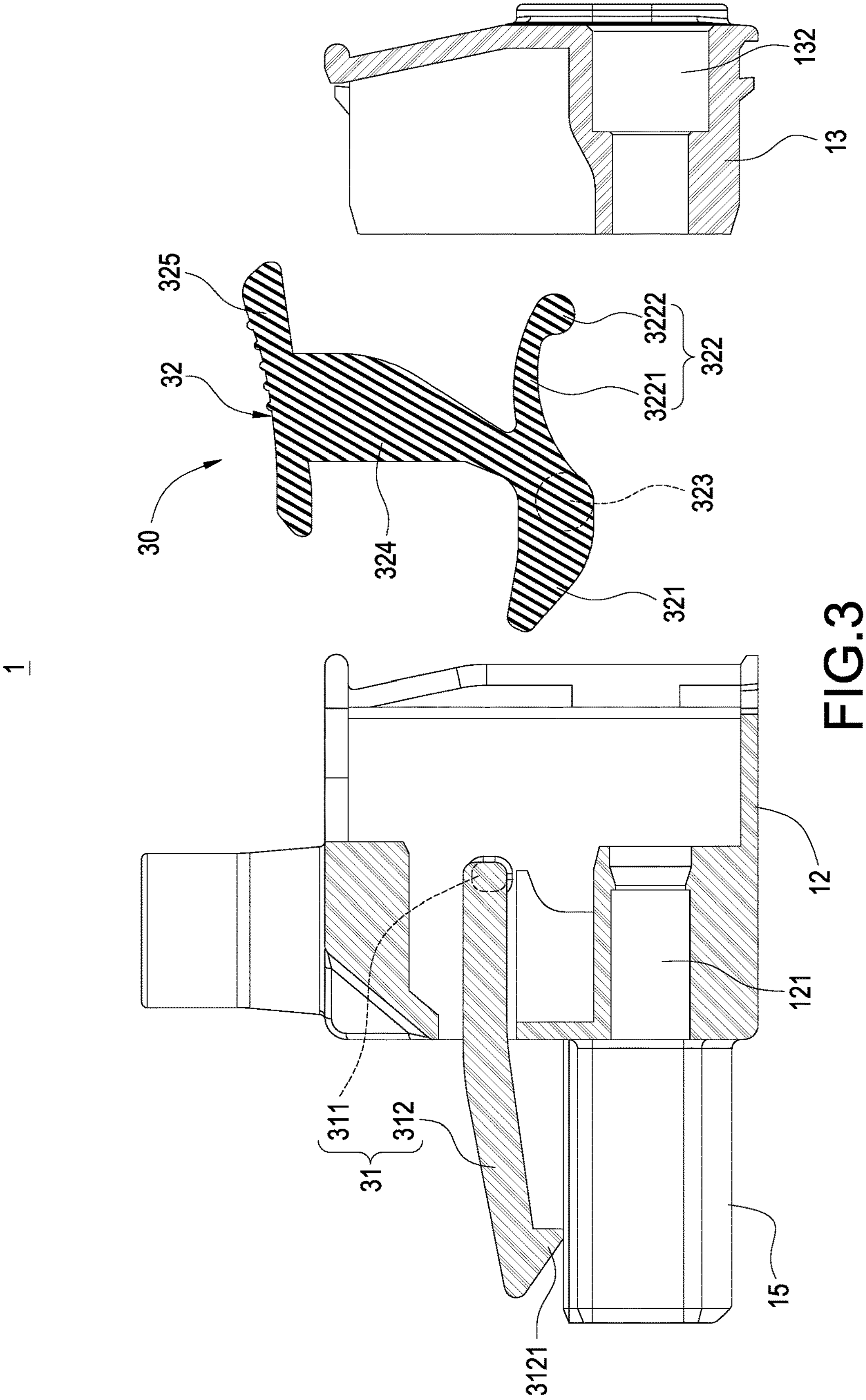
FIG. 3 is a cross-sectional exploded view of a plug connector of this disclosure.
Figure 4:
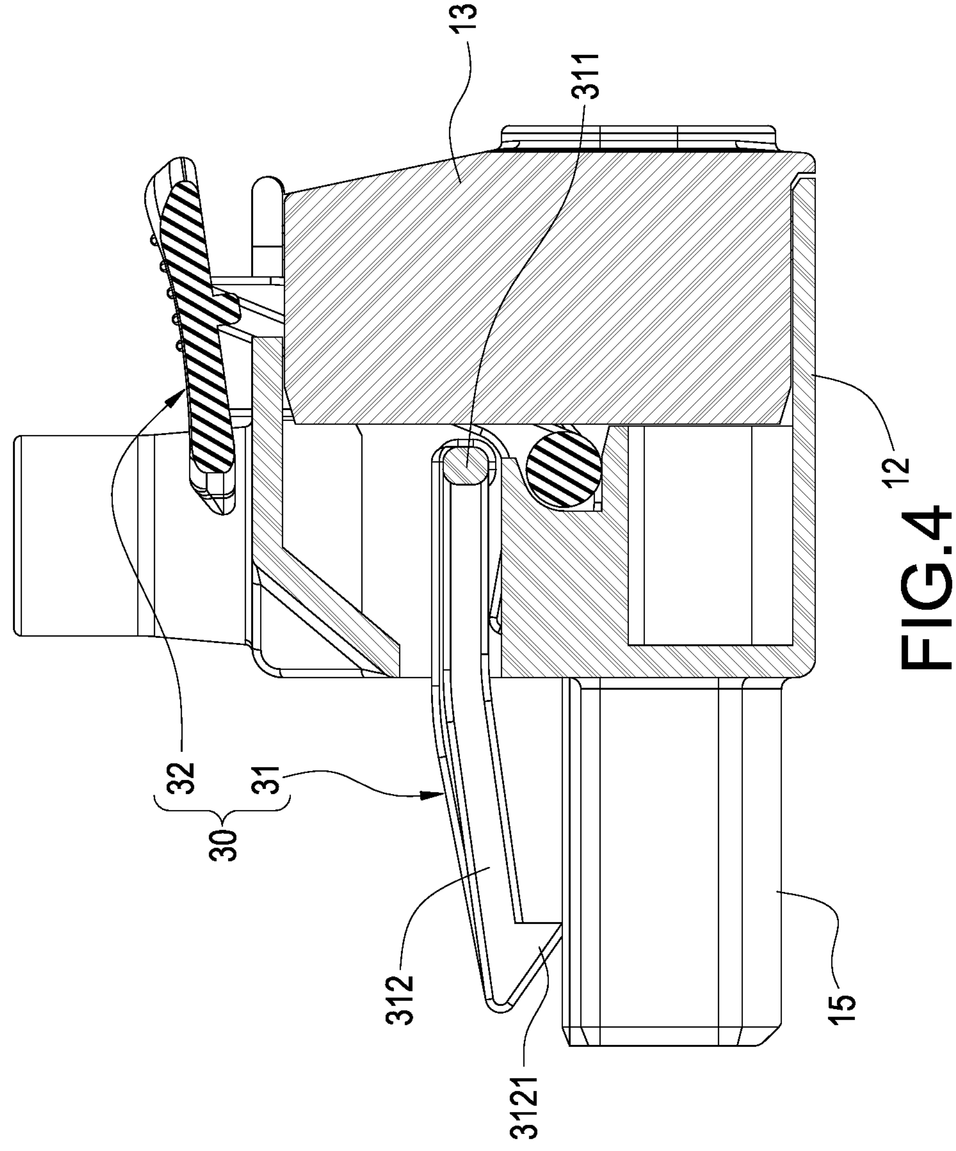
FIG. 4 is a cross-sectional view of a plug connector of this disclosure.
Figure 5:
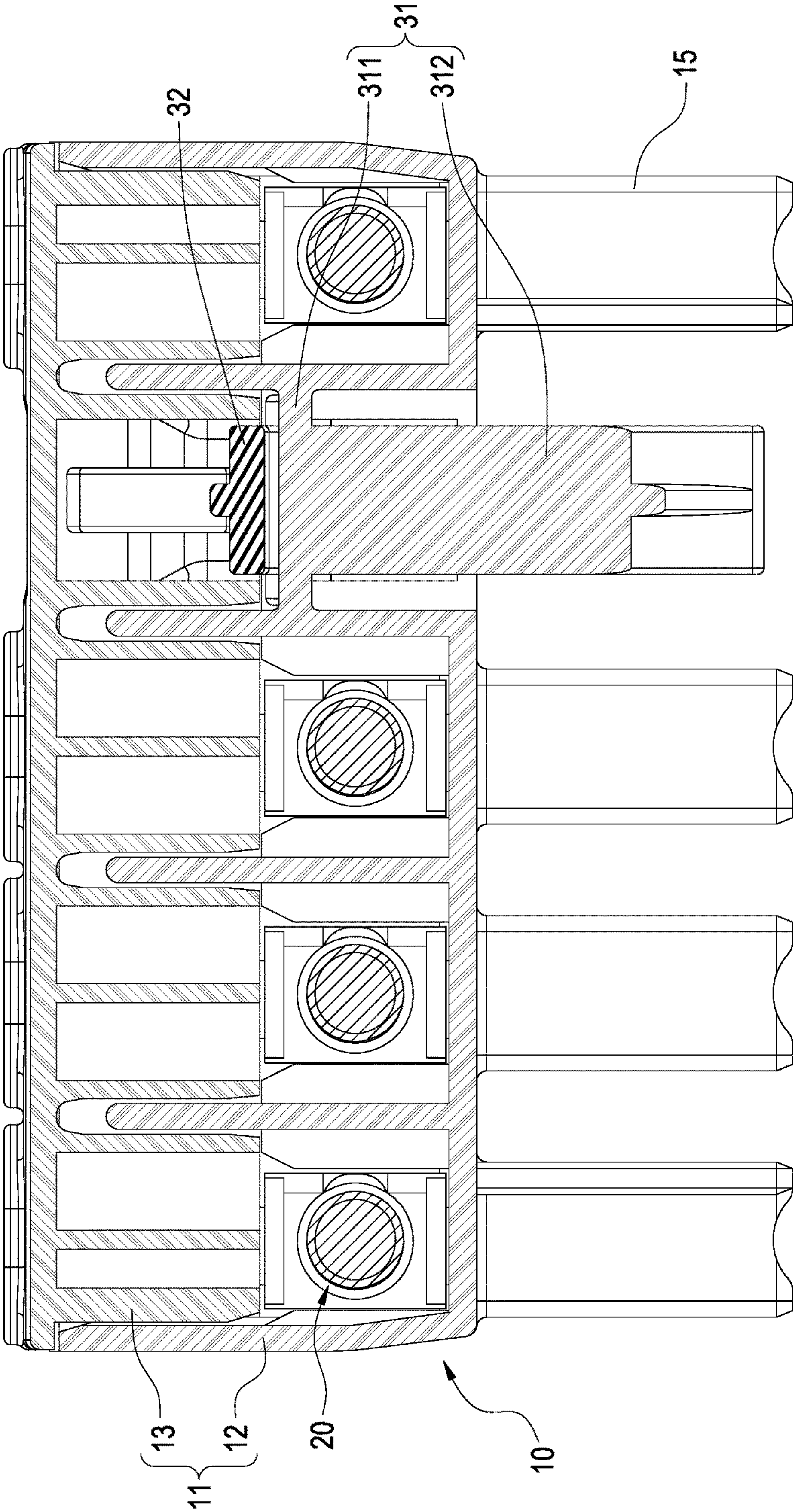
FIG. 5 is another cross-sectional view of a plug connector of this disclosure.
Figure 6:
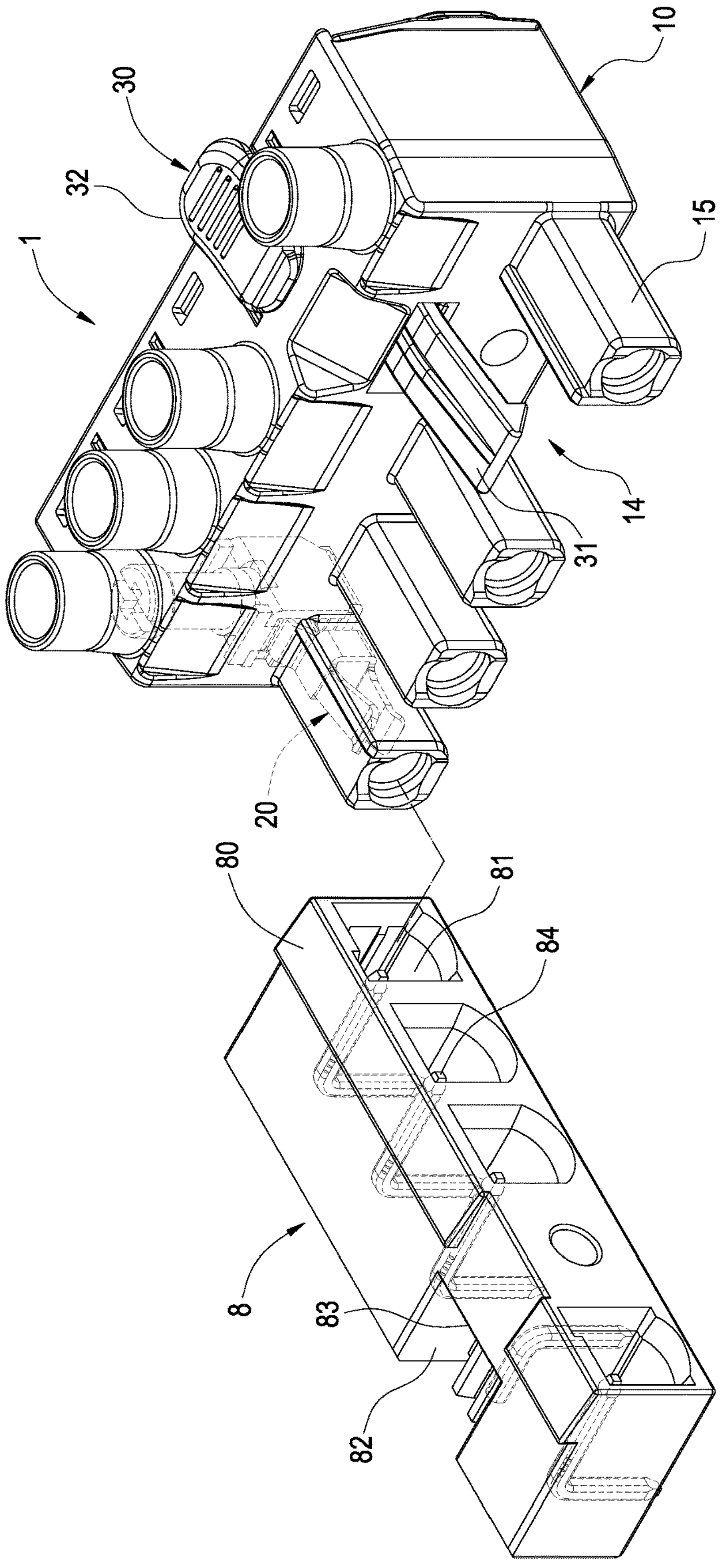
FIG. 6 is a perspective view showing a plug connector and a butt connector of this disclosure.
Figure 7:
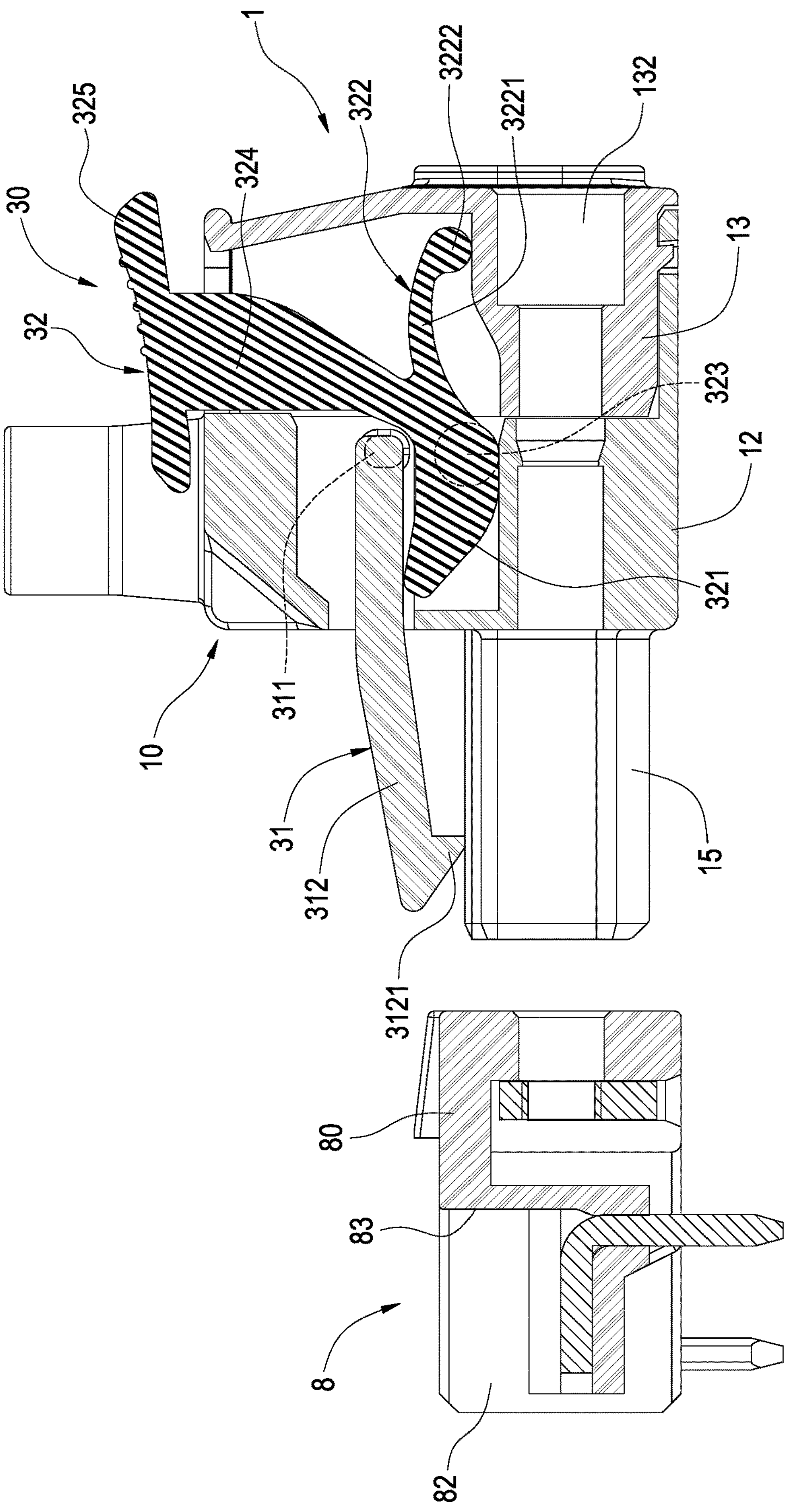
FIG. 7 is a cross-sectional exploded view of a plug connector and a butt connector of this disclosure.
Figure 8:
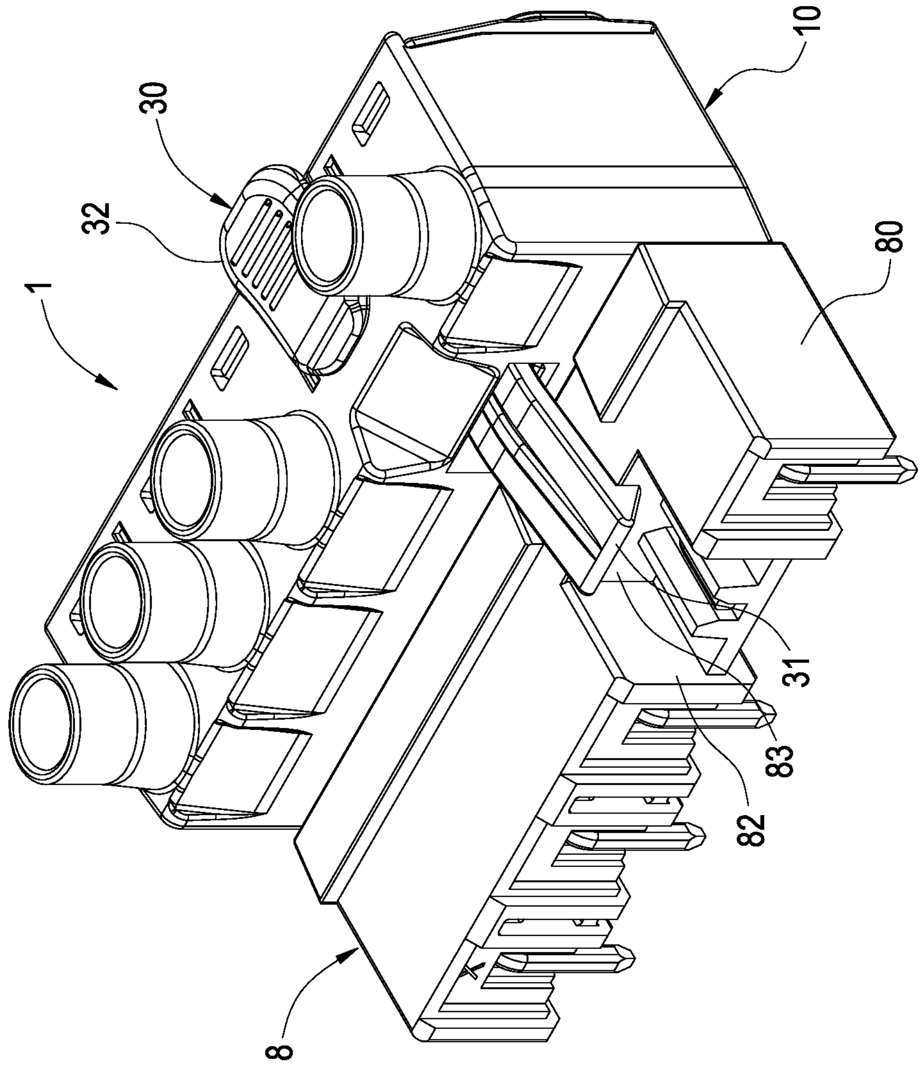
FIG. 8 is a perspective view of a plug connector and a butt connector combined with each other in accordance with this disclosure.
Figure 9:
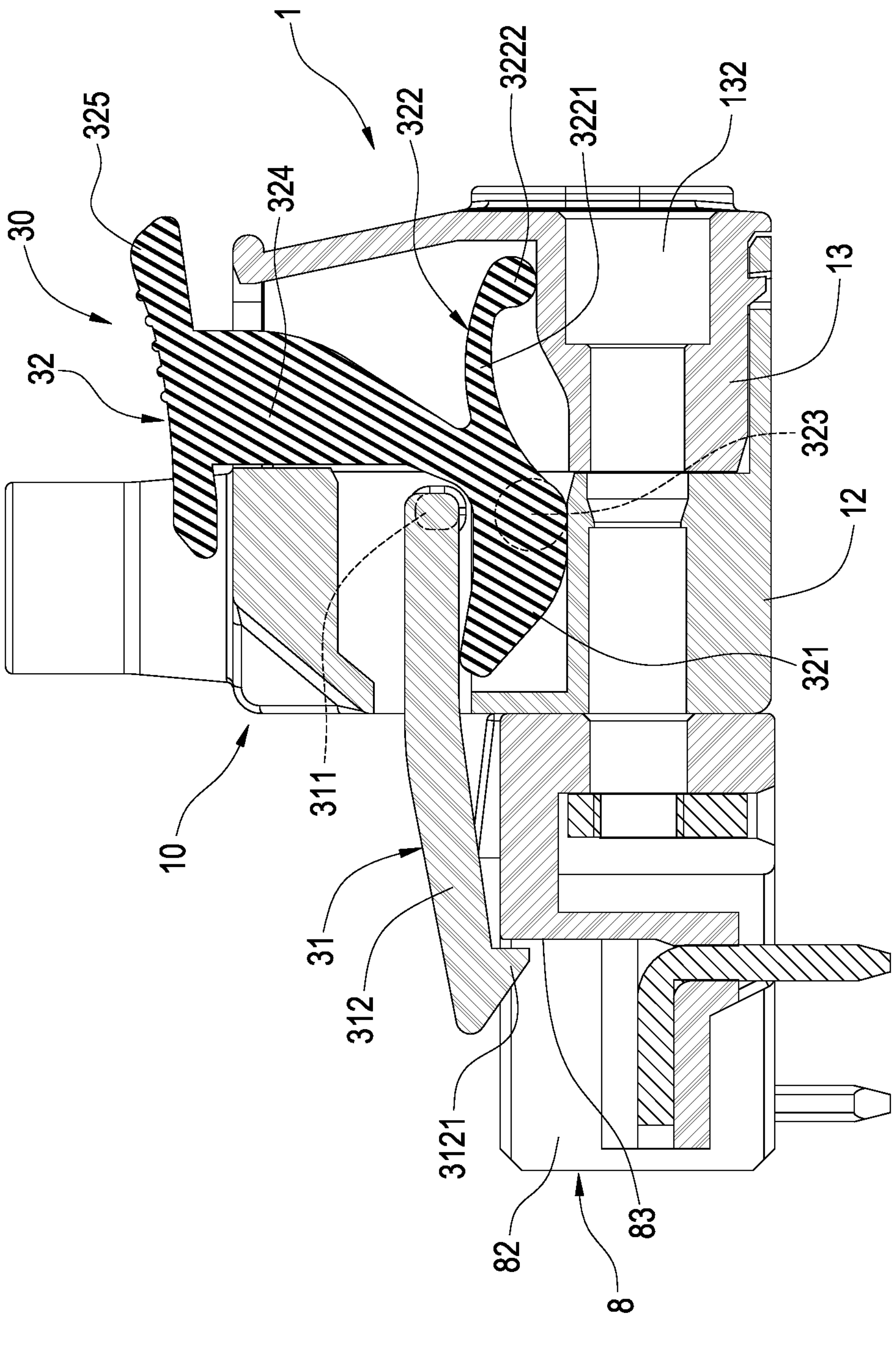
FIG. 9 is a cross-sectional view of a plug connector and a butt connector combined with each other in accordance with this disclosure.

With reference to FIGS. 1 to 9 for a plug connector of this disclosure, FIGS. 6 and 7 show that the plug connector 1 is provided for plugging in and combining with a butt connector 8, and the butt connector 8 includes a rectangular frame 80 and a plurality of conductive pins 84. The rectangular frame 80 is made of a desirable insulating material such as plastic, etc., and the rectangular frame 80 has a plurality of conductive slots 81 spaced from each other, an import channel 82 disposed between two adjacent conductive slots 81 and a locking edge 83 formed inside the import channel 82. Each conductive pin 84 is arranged corresponding to each conductive slot 81. The portion of each conductive pin 84 exposed from the rectangular frame 80 is provided for soldering and combining a printed circuit board (not shown in the figures), so that the butt connector 8 may be fixed onto the printed circuit board to form a socket connector.

With reference to FIGS. 1 to 5 for a plug connector 1 of this embodiment, the plug connector 1 mainly includes an insulating housing 10, a plurality of conductive terminals 20 and a lock release assembly 30.

The insulating housing 10 includes a main body part 11 and a plurality of hollow plungers 15. The main body part 11 includes a front casing 12 and a rear casing 13. The hollow plungers 15 are spaced from each other and extended outward from an end surface of the front casing 12. Both the front casing 12 and the hollow plunger 15 are made of a desirable insulating material such as plastic. A buckle operating area 14 is defined between two adjacent hollow plungers 15 of the front casing 12. The front casing 12 has a through hole 121 formed at a position corresponding to the buckle operating area 14. An open slot 122 is formed at a position corresponding to the buckle operating area 14 and on an upper side of front casing 12. In addition, the front casing 12 has a plurality of buckle slots 123 corresponding to the hollow plungers 15 and formed at an upper side of the front casing 12. A pivot slot 124 is formed inside the front casing 12 corresponding to the buckle operating area 14.

The rear casing 13 is a cover engaged with the corresponding front casing 12 and has a wire plug hole 131 formed at a position corresponding to each of the aforementioned hollow plungers 15, and the wire plug hole 131 is provided for inserting a wire (not shown in the figures). In addition, a via 132 is formed between two adjacent wire plug holes 131 and communicating with the through hole 121, and the rear casing 13 has a buckle 133 formed at an upper side of the rear casing 13 corresponding to each wire plug hole 131. Each buckle 133 is buckled and connected to each buckle slot 123.

Each conductive terminal 20 is accommodated in the front casing 12 and the hollow plunger 15 of the insulating housing 10 corresponding to each hollow plunger 15, and each conductive terminal 20 mainly includes a wire clamp 21 and a pin clamp 22 connected to the wire clamp 21. The wire clamp 21 is arranged corresponding to the wire plug hole 131, and the pin clamp 22 is extended into the hollow plunger 15.

The lock release assembly 30 is installed on the insulating housing 10, and mainly includes a locking part 31 and an actuating part 32 separately installed with respect to the locking part 31. The locking part 31 and the front casing 12 of the main body part 11 are formed in one piece (or integrally formed) and disposed above the buckle operating area 14. The locking part 31 mainly includes a hinge 311 connected to the front casing 12 and a lock tab 312 horizontally extended from the hinge 311. A hook 3121 is formed at an end of the lock tab 312 away from the hinge 311.

The actuating part 32 is arranged corresponding to the locking part 31 and pivotally connected to the front casing 12 of the main body part 11. The actuating part 32 mainly includes a force arm 321, a restoring spring plate 322 extended backward from the force arm 321, a pivot 323 extended from the left-side or right-side of the force arm 321, a stand 324 extended upward from the junction of the force arm 321 and the restoring spring plate 322, and a press handle 325 extended from the stand 324. The force arm 321, the restoring spring plate 322 and the pivot 323 are installed in the main body part 11. The stand 324 passes through the open slot 122 of the front casing 12. The press handle 325 is formed outside the main body part 11. The pivot 323 is pivotally connected to the pivot slot 124. An end of the force arm 321 away from the pivot 323 abuts against and is connected to the lower surface of the lock tab 312. The restoring spring plate 322 mainly includes a curved plate 3221 and a cylinder 3222 formed at an end of the curved plate 3221. The force arm 321 and the curved plate 3221 are spanned between the front casing 12 and rear casing 13. The force arm 321 and the cylinder 3222 abut against and are connected to the interior of the front casing 12 and the interior of the rear casing 13 respectively.

In FIGS. 6 to 9, during usage, each hollow plunger 15 of the plug connector 1 is precisely aligned, inserted and combined with each conductive slot 81 of the butt connector 8, and each conductive pin 84 is embedded into each pin clamp 22 to achieve an electric connection of each conductive terminal 20 with each conductive pin 84. When the hook 3121 of the lock tab 312 touches the upper surface of the rectangular frame 80, the locking part 31 uses its hinge 311 as the center of rotation to rotate and lift upward, and slide along the upper surface of the rectangular frame 80. After the hook 3121 reaches the locking edge 83, the hook 3121 moves down from the import channel 82 to snap to the locking edge 83 securely by the elastic force of the lock tab 312. At the same time, the actuating part 32 is under the effect of the elastic force of the restoring spring plate 322, so that the actuating part 32 is secured onto the main body part 11.

Figure 10:
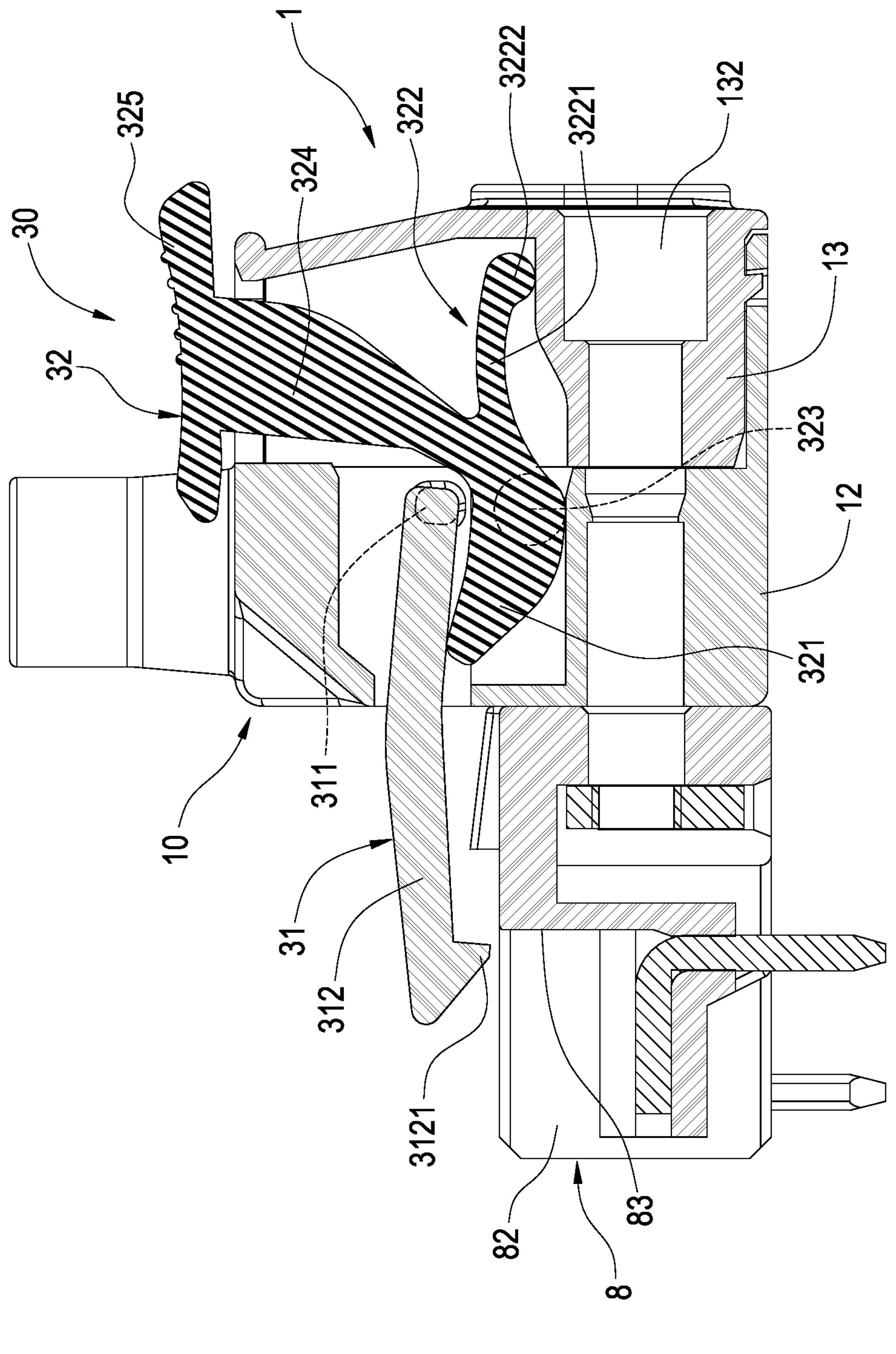
FIG. 10 is a first cross-sectional view showing the using status of a plug connector and a butt connector in accordance with this disclosure.
Figure 11:
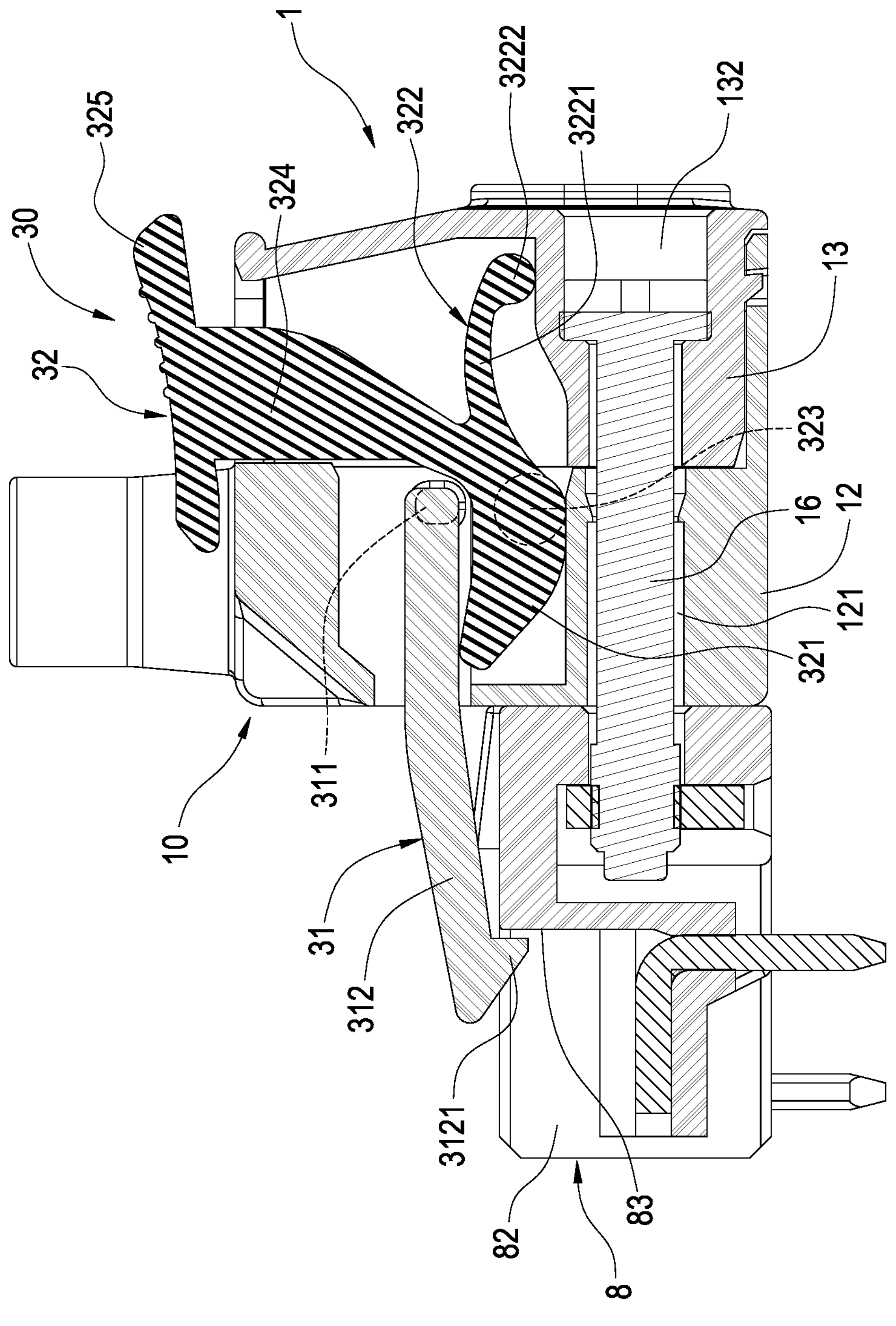
FIG. 11 is a second cross-sectional view showing the using status of a plug connector and a butt connector in accordance with this disclosure.

With reference to FIGS. 10 and 11, during the unlocking process, an action force is applied to the press handle 325 of the actuating part 32, and the actuating part 32 uses its pivot 323 as the center of rotation to prop up the lock tab 312 through the force arm 313. At the same time, the locking part 31 uses its hinge 311 as the center of rotation to rotate upward, so as to unlock the hook 3121 of the lock tab 312 from the locking edge 83 of the butt connector 8.

In summation of the description above, this disclosure can surely achieve the expected objectives and overcome the drawbacks of the prior art. While this disclosure has been described by means of specific embodiments, numerous modifications and variations could be made thereto by those skilled in the art without departing from the scope and spirit of this disclosure set forth in the claims.

What is claimed is:

1. A plug connector, plugged and combined with a butt connector, the plug connector comprising:

an insulating housing, comprising a main body part and a plurality of hollow plungers spaced apart from each other and extended from the main body part;

a plurality of conductive terminals, each conductive terminal contained in the insulating housing corresponding to each hollow plunger; and a lock release assembly, installed on the insulating housing and comprising a locking part and an actuating part separately installed with respect to the locking part, the actuating part arranged corresponding to the locking part and pivotally coupled to the main body part, the locking part comprising a hinge coupled to the main body part and a lock tab extended from the hinge, and the lock tab comprising a hook disposed on an end thereof away from the hinge;

wherein, when an action force is applied to the actuating part, the actuating part drives the locking part to rotate to release the hook of the lock tab from the butt connector.

2. The plug connector according to claim 1, wherein the actuating part comprises a force arm, a restoring spring plate extended from the force arm and a pivot extended from the force arm, the main body part comprises a front casing and a rear casing engaged with the front casing, and the force arm, the restoring spring plate and the pivot are installed in the main body part.

3. The plug connector according to claim 2, wherein the front casing comprises a pivot slot, and the actuating part passes through the pivot and is pivotally coupled to the pivot slot, and the pivot is disposed on a connection position between the force arm and the restoring spring plate.

4. The plug connector according to claim 3, wherein the restoring spring plate comprises a curved plate coupled to the force arm and a cylinder disposed on an end of the curved plate away from the force arm, the force arm and the curved plate straddle between the front casing and the rear casing, and the force arm and the cylinder abut against inside the front casing and the rear casing respectively.

5. The plug connector according to claim 3, wherein an end of the force arm away from the pivot abuts against a lower surface of the lock tab.

6. The plug connector according to claim 2, wherein the actuating part further comprises a stand extended from the force arm and a press handle extended from the stand, the front casing comprises an open slot, the stand passes through the open slot, and the press handle is disposed outside the main body part.

7. The plug connector according to claim 1, wherein the main body part comprises a front casing and a rear casing assembled to the front casing, and each hollow plunger is extended outward from an end surface of the front casing, and the rear casing comprises a plurality of wire plug holes corresponding to the hollow plungers respectively.

8. The plug connector according to claim 7, wherein each conductive terminal comprises a wire clamp and a pin clamp coupled to the wire clamp, the wire clamp is arranged corresponding to the wire plug hole, and the pin clamp is extended into the hollow plunger.

9. The plug connector according to claim 7, wherein a buckle operating area is defined between two hollow plungers of the front casing adjacent to each other, and the lock tab is disposed in the buckle operating area.

10. The plug connector according to claim 7, wherein the front casing comprises a buckle slot corresponding to each hollow plunger, and the rear casing comprises a plurality of buckles buckled securely with and arranged corresponding to the buckle slots.

* * * * *